United States Patent Office 3,804,871
Patented Apr. 16, 1974

3,804,871
ENDCAPPED POLYMERIC TIN MERCAPTIDES FOR STABILIZING POLYVINYL CHLORIDE
Bernard Buchholz, Blue Bell, Pa., assignor to Pennwalt Corporation, Philadelphia, Pa.
No Drawing. Filed Jan. 4, 1973, Ser. No. 321,113
Int. Cl. C07f 7/22
U.S. Cl. 260—429.7                14 Claims

ABSTRACT OF THE DISCLOSURE

Polyvinyl chloride compositions stabilized against thermal degradation are provided by adding a stabilizing amount of an endcapped polymeric tin mercaptide. The new stabilizers in PVC show improved resistance to early yellowing compared to the corresponding non-endcapped products. The stabilizers are prepared by contacting a cycloaliphatic dimercaptan such as 2,9-p-menthanedithiol or ethylcyclohexyl dimercaptans with an excess of an alkyltin compound such as dibutyltin oxide and then endcapping the compound by contacting it with a mercaptoester such as isooctyl 3-mercaptopropionate.

---

The use of tin mercaptides to stabilize polyvinyl chloride against thermal degradation is well known. Examples of such stabilizers sold commercially are dibutyltin bis (lauryl mercaptide), dibutyltin bis(isooctyl thioglycolate) and dioctyltin bis(isooctyl thioglycolate). Although these stabilizers are among the most effective available, there remains a need for stabilizers having even greater efficiency in order to meet more stringent processing conditions at higher temperatures, e.g., in blow-molding of PVC bottles.

Polymeric tin mercaptide stabilizers for polyvinyl chloride having the structure.

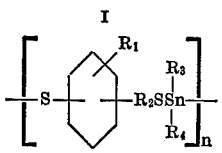

where $R_1$=H or lower alkyl, $R_2$=lower ($C_2$–$C_4$) alkylene; $R_3$ and $R_4$=$C_4$ to $C_{10}$ alkyl, and $n$ is an integer from 2 to 10, are disclosed in U.S. 3,646,081. The endgroups of these polymeric products are believed to be mercaptan groups plus hydroxyl, carboxyl or halide groups depending on the tin reagent used. The preparation of these compounds as disclosed in U.S. 3,646,081 is incorporated herein by reference. These compounds in PVC exhibit exceptionally good long-term stabilizing effects in combination with surprisingly low toxicity compared to current commercial stabilizers. This makes them particularly valuable as stabilizers in plastic containers, film, bottles and other articles that come in contact with food.

One important quality lacking in the compounds of U.S. 3,646,081 compared to tin mercaptides currently being marketed as PVC stabilizers, is ability to inhibit early yellowing of PVC in the accelerated oven tests conventionally used to measure stabilizer efficiency. PVC containing commercial tin mercaptide stabilizers such as the dialkyltin bis(isooctylthioglycolates) remains colorless for a relatively longer period of time, while PVC containing an equal quantity of the tin mercaptides of U.S. 3,646,081 acquires a yellow color during the early period of the accelerated tests. This deficiency is undesirable, since it can result in discoloration of a PVC article during fabrication particularly in high temperature fabricating processes such as the blow-molding of PVC bottles.

In accord with the present invention, there are now provided novel, polymeric, mercaptoester-endcapped tin mercaptide products which have superior ability as thermal stabilizers for polyvinyl chloride or polyvinylidene chloride, including inhibition of early yellowing in accelerated oven tests. The early yellowing defect can be overcome by endcapping the polymeric tin mercaptide products with mercaptoesters such as isooctyl thioglycolate, dodecyl thioglycolate, octadecyl thioglycolate, isooctyl 3-mercaptopropionate, dodecyl 3-mercaptopropionate, methyl 4-mercaptobutyrate and isooctyl 4-mercaptobutyrate. This endcapping technique involves reacting the dimercaptan with an excess of the tin reagent, i.e., at a mole ratio of tin reagent to dimercaptan greater than 1:1, to assure tin-hydroxide rather than mercaptan endgroups on the polymer, then endcapping with a mercaptoester. The numerous other advantages of compounds having the structure shown in (I) above, e.g., superior long-term stabilizing ability and excellent rheology (with no crosslinking of the PVC), are not diminished by this treatment.

The polymeric tin mercaptides are prepared first by reacting a dimercaptan of the formula

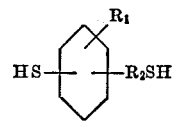

where $R_2$ is $C_2$ to $C_4$ alkylene, $R_1$ is H or lower alkyl, in an inert solvent with 1 to 99 mole percent excess of a tin compound of the formula:

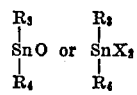

where X is halogen or carboxylate and $R_3$ and $R_4$ are $C_1$ to $C_{10}$ alkyl.

The polymeric tin mercaptides are then endcapped by adding to the reaction mixture a mercaptoester of the formula:

$$HSR_5COOR_6$$

where $R_5$ is $C_1$ to $C_4$ alkylene and $R_6$ is $C_1$ to $C_{20}$ alkyl. The reaction is continued until the endcapping is completed. The inert solvent is stripped by distillation leaving the stabilizer as a residue.

The endcapped polymeric tin mercaptide stabilizers are added to polyvinyl chloride or polyvinylidene chloride in amounts and by methods well known in the art. Other additives such as antioxidants, lubricants, plasticizers, colorants and fillers may be added with the thermal stabilizers of this invention.

The preparation of the new endcapped tin mercaptides is illustrated by the following equations:

(1) 

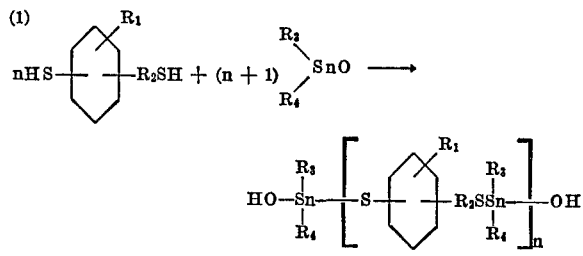

where $R_1$, $R_2$, $R_3$, $R_4$ and $n$ are as defined previously.

(2) 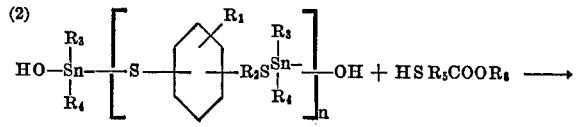

(II)

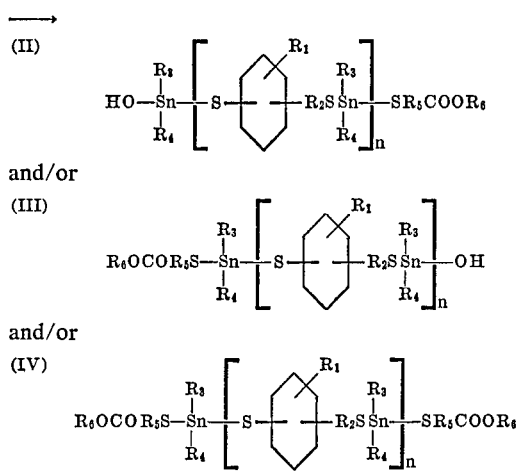

and/or (III)

and/or (IV)

where $R_5$ and $R_6$ are as defined previously.
When

(X=halide, carboxylate) is used as the tin reagent, halide or carboxylate (rather than hydroxide) endgroups results in the above equations.

In the reaction represented by Equation 1 above, the excess of tin reagent over dimercaptan can be in the range of 1–99 mole percent, and is preferably in the range of 10–60 mole percent.

In the reaction represented by Equation 2, the amount of mercaptoester to be used will depend on the molar excess of tin reagent over dimercaptan employed in the reaction of Equation 1. For each excess mole tin reagent over dimercaptan employed, in Equation 1, from 0.5 to 1.5 moles, preferably about 1 mole, or mercaptoester must be used in the reaction of Equation 2. Mercaptoester ratios outside this range result in products having lower efficiency as vinyl stabilizers.

The exact structure of the preferred products, in which the mole ratio of excess tin reagent to mercaptoester is about 1:1, is unknown and may be any one of, or a mixture of, structures II, III and IV. Hydroxide endgroups may actually be coupled by intermolecular elimination of $H_2O$ to form Sn—O—Sn linkages as illustrated in Structure V.

(V)

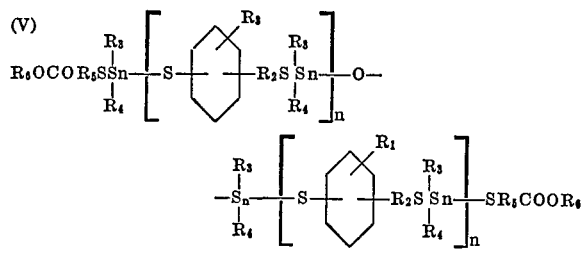

When the tin reagent used in excess is dialkyltin oxide, tin-oxygen linkages may also be present in the endgroups as illustrated in structure VI.

(VI)

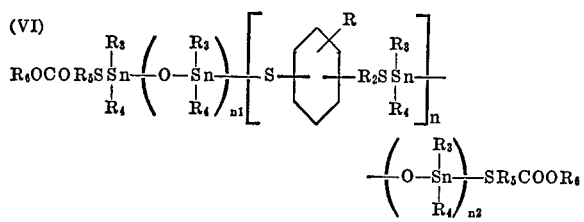

where $n_1$ and $n_2$ are integers from 1 to 10.

The polymeric tin mercaptides of Equation 1 are prepared by placing the weighed reactants and a hydrocarbon solvent in a reactor equipped with stirrer, reflux condenser and water trap. The temperature of the reaction mixture is raised until the solvent refluxes. The solvent is preferably one which will azeotrope water, such as benzene, toluene, xylene, hexane, heptane, octane, cyclohexane or chloroform, if water is a reaction by-product. The reaction is continued until the dimercaptan is completely reacted. When dialkyltin oxide is used and water is a reaction by-product, the completion is indicated when no further water is collected in the trap.

Upon completion of Equation 1 reaction, the weighed amount of mercaptoester is added to the reaction mixture and refluxing is continued to effect endcapping. Again, where water is a reaction by-product the completion is indicated by no further collection of water in the trap. The solvent is removed by distillation and the residual liquid is the endcapped product.

The following examples will illustrate the preparation of the compounds of the invention. The endcapped products are designated as Stabilizer A, Stabilizer B, etc., to identify them in subsequent testing as vinyl resin stabilizers.

Example 1.—Preparation of Butyltin Stabilizer A

A solution of 184.8 g. (1.05 mol) of beta-mercaptoethyl-3(and 4)-mercaptocyclohexane (obtained from the free radical catalyzed addition of $H_2S$ to 4-vinyl-1-cyclohexene) and 388.2 g. (1.56 mol) of dibutyltin oxide in 2.8 liters of toluene is refluxed until by-product $H_2O$ is no longer collected in a Barrett trap by azeotropic distillation. A solution of 92.4 g. (0.45 mol) of isooctyl thioglycolate in 200 cc. of toluene is added. The reaction mixture is refluxed an additional one hour, solvent is stripped under vacuum and the residue is filtered under nitrogen pressure. A clear liquid product is obtained in almost quantitative yield. On long standing, the product may become turbid, but there is no loss of effectiveness as a PVC stabilizer.

Analysis (percent): C, 45.59; H, 7.50; S, 8.92; Sn, 31.07.

In the same manner from 0.25 to 0.75 mol of methyl, dodecyl, or octadecyl thioglycolate is substituted for isooctyl thioglycolate. Octadecyl thioglycolate produces a low melting, white solid product.

Example 2.—Preparation of Butyltin Stabilizer B

A solution of 184.8 g. (1.05 mol) of beta-mercaptoethyl-3(and 4)-mercaptocyclohexane and 388.2 g. (1.56 mol) of dibutyltin oxide in 2.5 liters of toluene is refluxed until by-product $H_2O$ is no longer collected in a Barret trap by azeotropic distillation. To the refluxing solution is added 98.3 g. (0.45 mol) of isooctyl 3-mercaptopropionate. After refluxing an additional one hour, the solvent is stripped under vacuum and the residual product is filtered under nitrogen pressure. Obtained are 569 g. of clear liquid product with refractive index 1.5544 (25° C.). The product remains clear and homogenous on prolonged storage, with no loss in effectiveness as a PVC stabilizer.

Analysis (percent): C, 49.43; H, 8.00; S, 11.87; Sn, 27.37.

Example 3.—Preparation of Butyltin Stabilizer C

A solution of 388.2 g. (1.56 mole) of dibutyltin oxide, 214.2 g. (1.05 mol) of 2,9-p-menthanedithiol (obtained from the free radical catalyzed addition of $H_2S$ to d-limonene or dipentene) and 2.5 liters of toluene is refluxed until no more $H_2O$ is obtained by azeotropic distillation. To the reaction mixture are added 98.3 g. (0.45 mol) of isooctyl 3-mercaptopropionate. Refluxing is continued for 1 hour after all additional $H_2O$ is removed. The solvent is stripped and the residual product is filtered under nitrogen pressure. Obtained are 525.2 g. of the clear liquid product having refractive index 1.5546 (25° C.).

Analysis (percent): C, 49.58; H, 8.12; S, 11.18; Sn, 27.95.

Example 4.—Preparation of Octyltin Stabilizer D

A solution of 308.6 g. (1.75 mol) of beta-mercaptoethyl-3(and 4)-mercaptocyclohexane and 790 g. (2.19 mol) of dioctyltin oxide in 3 liters of toluene is refluxed until azeotroped water no longer collects in a Barrett trap. To the refluxing solution is added 86 g. (0.39 mol) of isooctyl 3-mercaptopropionate. Refluxing is continued for 1 additional hour. The toluene is stripped under vacuum and the residual product is filtered under nitrogen pressure. Obtained are 1075 g. of clear liquid product having refractive index 1.5348 (25° C.).

*Analysis* (percent): C, 56.63; H, 9.15; S, 10.40; Sn, 21.87.

Example 5.—Preparation of Methyltin Stabilizer E

A solution containing 61.8 g. (0.350 mol) of beta-mercaptoethyl - 3(and 4) - mercaptocyclohexane and 76.8 g. (0.466 mol) of dimethyltin oxide in 350 cc. of toluene is refluxed until by-product water is no longer formed. A solution of 32.8 g. (0.15 mol) of isooctyl 3-mercaptopropionate in 35 cc. of toluene is added to endcap the polymeric product. Refluxing is continued until no additional water from the endcapping reaction is formed.

The solvent is stripped and the residual liquid is filtered under nitrogen pressure. Obtained are 114.8 g. of water-white product having refractive index 1.5870 (25° C.).

*Analysis* (percent): C, 40.83; H, 6.86; S, 16.72; Sn, 33.06.

The thermal stabilizers are incorporated in vinyl or vinylidene chloride resins by any of the conventional methods such as dry mixing followed by milling or extruding. A stabilizing amount of the endcapped polymeric tin mercaptide is used which is usually in the range of ½ to 4 parts per hundred of resin (phr.). Individual endcapped polymeric tin mercaptides may be employed as thermal stabilizers or mixtures of them. The stabilizers of this invention may also be combined with other thermal stabilizers, ultraviolet light stabilizers, antioxidants, impact modifiers, colorants, fillers, plasticizers etc. for adding to vinyl or vinylidene chloride resins.

Among the superior properties of the compounds of this invention as represented by Structures II, III, IV, V and VI, as stabilizers for vinyl and vinylidene chloride are the following:

*Non-crosslinking*: They are unique among polymeric tin stabilizers in that they do not adversely affect processing rheology by crosslinking PVC. This adverse effect of the prior art polymeric tin stabilizers is clearly pointed out in the Encyclopedia of Polymer Technology, volume 12, page 763 (1970).

*Non-volatility*: They are the first practical PVC stabilizers that exhibit zero plate-out on hot mill rollers and molds, reducing downtime for cleaning.

*Superior static and dynamic stability*: Longer-term processing, more PVC scrap recycling, and higher temperature end uses are possible.

*Higher PVC heat distortion temperatures*: Higher mold release temperatures make possible shorter cooling cycles and faster fabrication of PVC articles with these stabilizers. Higher temperature hot-filling of PVC bottles is also possible.

*Lower migration and leaching rates*: They have lower mobility in plastics than conventional monomeric stabilizers of lower molecular weight.

*Superior clarity in PVC*: They have better compatibility with PVC than conventional monomeric stabilizers. This is an important asset for the clear plastic bottles market.

*Higher inherent thermal stability*: Thermogravimetric analyses (TGA) show them to be thermally stable at temperatures 85–100° F. higher than corresponding commercial stabilizers such as the dialkyltin bis (isooctyl thioglycolates). Consequently, the stabilizers of this invention do not undergo thermal degradation even at maximum temperatures used for PVC fabrication.

*Superior color and gloss retention*: These properties are important for pigmented pipe, pipe fittings, siding, gutters and other building products.

*Non-toxicity*: The endcapped polymeric tin mercaptide stabilizers of this invention are expected to have the same low toxicities as the corresponding nonendcapped polymeric tin mercaptide compounds disclosed in U.S. 3,646,081.

The efficiencies of the compounds of this invention as thermal stabilizers for vinyl halide polymers are demonstrated in the following Examples describing standard oven tests (static heat stability) and Brabender milling tests (dynamic heat stability):

Example 6.—Oven Test Evaluation of Butyltin Stabilizer A in rigid PVC

Butyltin Stabilizer A (Example 1) is compared with the corresponding polymeric butyltin stabilizer (1) that is not endcapped and with the widely used commercial stabilizer Thermolite 66 marketed by M & T Corporation, believed to be dibutyltin bis(isooctyl thioglycolate).

PVC sheets, 40 mils thick, are prepared by hot milling 3 phr. of stabilizer into a standard rigid PVC resin formulation. One-inch square samples are stamped from the PVC sheets. These are placed in an air-circulating oven at about 385° F. Sets of samples are removed at various time intervals to compare them for resistance to early yellowing and effectiveness of long-term stabilization (time to dark brown or black color). The oven test appears in Table 1.

TABLE 1

| Minutes at 385° F.: | Thermolite 66 (M & T Corp.) | Stabilizer A (endcapped) | Stabilizer of U.S. 3,646,081 (no endcapping) [1] |
|---|---|---|---|
| 0 | Colorless | Colorless | Very pale yellow.[2] |
| 5 | do | do | Light yellow. |
| 10 | do | do | Do. |
| 15 | Very pale yellow | do | Do. |
| 20 | Light yellow | Very pale yellow | Do. |
| 25 | do | Light yellow | Do. |
| 30 | Yellow | do | Do. |
| 45 | Black | Yellow | Yellow. |
| 60 | do | Brown | Brown. |
| 70 | do | do | Black. |

[1] Product prepared by reacting beta-mercaptoethyl-3(and 4)-mercaptocyclohexane and dibutyltin oxide in a 1:1 mole ratio and containing 28.2% tin, as described in Example 1 of U.S. 3,646,081.
[2] Slight discoloration occurs during hot-milling to prepare the sample.

The test results clearly show the superior stabilizing ability of the endcapped butyltin Stabilizer A with respect to early yellowing resistance and long-term thermal stability.

Example 7.—Oven Test Evaluation of Butyltin Stabilizer B in rigid PVC

Butyltin Stabilizer B (Example 2) is compared with the same stabilizers as were used for comparison with butyltin Stabilizer A in Example 6.

Test samples containing 3 phr. of stabilizer are prepared and tested in a 380° F. oven as described in Example 6. The oven test appears in Table 2.

TABLE 2

| Minutes at 380° F.: | Thermolite 66 (M & T Corp.) | Stabilizer B (endcapped) | Stabilizer U.S. 3,646,081 (no endcapping) [1] |
|---|---|---|---|
| 0 | Colorless | Colorless | Light yellow.[2] |
| 5 | do | do | Do. |
| 10 | do | do | Do. |
| 15 | do | do | Yellow. |
| 20 | do | do | Do. |
| 25 | Very pale yellow | do | Do. |
| 30 | do | Very pale yellow | Do. |
| 45 | Light yellow | Yellow | Do. |
| 60 | Yellow | do | Do. |
| 75 | Brown | do | Do. |
| 90 | Black | do | Brown edge. |
| 110 | do | Brown | Brown. |

[1] See Table 1, footnote 1.
[2] Slight discoloration occurs during hot-milling to prepare the sample.

Example 8.—Oven Test Evaluation of Butyltin Stabilizer C in rigid PVC

Endcapped butyltin Stabilizer C (Example 3) is compared with endcapped butyltin Stabilizer B (Example 2) and with the widely used commercial butyltin stabilizer Thermolite 66 (M & T Corporation).

Test samples containing 3 phr. of stabilizer are prepared and tested in a 380° F. oven as described in Example 6.

The test results tabulated below show that Stabilizer C is equal to Stabilizer B and to Thermolite 66 in its resistance to early yellowing and that Stabilizer C is superior to Thermolite 66 as a long-term stabilizer for PVC. The oven tests appear in Table 3.

TABLE 3

| Minutes at 380° F.: | Thermolite 66 (M & T Corp.) | Stabilizer B (endcapped) | Stabilizer C (endcapped) |
|---|---|---|---|
| 0 | Colorless | Colorless | Colorless. |
| 5 | do | do | Do. |
| 10 | do | do | Do. |
| 15 | do | do | Do. |
| 20 | Very pale yellow | Very pale yellow | Very pale yellow. |
| 25 | Light yellow | do | Do. |
| 30 | do | do | Do. |
| 60 | Yellow | Yellow | Yellow. |
| 80 | Black | do | Do. |
| 100 | do | Amber | Amber. |
| 110 | do | Black | Black. |

Example 9.—Oven Test Evaluation of Octyltin Stabilizer D in plasticized PVC

Stabilizer D (Example 4) is compared with the corresponding polymeric octyltin stabilizer [1] that is not endcapped and with the widely used commercial stabilizer Thermolite 831 marketed by M & T Corporation and believed to be dioctyltin bis(isooctyl thioglycolate).

PVC sheets, 40 mils thick, containing dioctyl phthalate plasicizer (2 parts PVC resin to 1 part plasticizer) and 2.3 phr. of stabilizer are prepared on a hot mill. One-inch square test samples are stamped from the PVC sheets and tested in a 380° F. oven as described in Example 6. The oven tests appear in Table 4.

TABLE 4

| Minutes at 380° F.: | Thermolite 831 (M & T Corp.) | Stabilizer D (endcapped) | Stabilizer of U.S. 3,646,081 (no endcapping) [1] |
|---|---|---|---|
| 0 | Colorless | Colorless | Colorless. |
| 5 | do | do | Do. |
| 10 | do | do | Very pale yellow. |
| 15 | do | do | Light yellow. |
| 20 | do | do | Do. |
| 25 | do | do | Do. |
| 30 | do | do | Do. |
| 60 | Light yellow | Light yellow | Do. |
| 80 | Amber | Yellow | Yellow. |
| 100 | Brown | do | Do. |
| 120 | do | Brown | Brown. |

[1] See Table 1, footnote 1.

The test results clearly show that the isooctyl mercaptopropionate endcapping (Stabilizer D) overcomes the early yellowing defect of the non-endcapped product [2] with no loss in long-term stabilizing superiority (time to brown discoloration) when compared to the commercial octyltin stabilizer Thermolite 831 (M & T Corporation).

[1] Product prepared by reacting beta-mercaptoethyl-3(and 4)-mercapto cyclohexane and dioctyltin oxide in a 1:1 mole ratio, containing 21.9% Sn, as described in Example II of U.S. 3,646,081.
[2] Same as footnote 1, same example.

Example 10.—Oven test evaluation of methyltin stabilizer E in rigid PVC

Endcapped methyltin Stabilizer E (Example 5) is compared with endcapped butyltin Stabilizer B (Example 2) and with the widely used commercial stabilizer Thermolite 66 (M & T Corporation). Rigid PVC samples containing 3 phr. stabilizer are prepared and tested in a 380° F. oven as described in Example 6.

The PVC samples containing Stabilizer E and Stabilizer B are equal to the PVC sample containing Thermolite 66 in resistance to early yellowing. The samples containing Stabilizer E and Stabilizer B give 47% and 38% longer-term stabilization (i.e., time to blackening), respectively, than the sample containing Thermolite 66.

Example 11.—Brabender Rheology Evaluation of Butyltin Stabilizer B in rigid PVC The processing rheology of rigid PVC containing 4 phr. of Stabilizer B (Example 2) was examined by means of a Brabender Plasti-corder at 350° F. The melt viscosity of the PVC did not increase in the portion of the Brabender torque-versus-time curve between melting and final decomposition of the PVC. This shows that Stabilizer B does not adversely affect processing rheology by cross-linking the PVC resin, as do all other known polymeric tin stabilizers such as Advastab 360 marketed by Cincinnati Milacron Chemicals, Inc., and believed to be polymeric dibutyltin 3-mercaptopropionate, $$\pm(C_4H_9)_2SnSCH_2CH_2COO\pm_n$$

Example 12.—Thermogravimetric Analysis (TGA) of Butyltin Stabilizer B and Octyltin Stabilizer D The greater inherent thermal stabilities of Stabilizer B (Example 2) and Stabilizer D (Example 4) compared to the widely used commercial butyltin stabilizer Thermolite 66 and the octyltin stabilizer Thermolite 831, respectively, are shown by the TGA data in Table 5 below:

TABLE 5

| | Initial decomposition occurs, ° F. |
|---|---|
| Butyltins: | |
| Thermolite 66 | 320 |
| Stabilizer B | 419 |
| Octyltins: | |
| Thermolite 831 | 360 |
| Stabilizer D | 446 |

I claim:
1. The compositions prepared by contacting a dimercaptan of the formula

where $R_2$ is $C_2$ to $C_4$ alkylene and $R_1$ is H or lower alkyl, with 1 to 99 mole percent excess of a tin compound of the formula

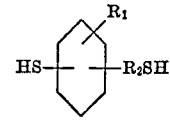

where X is halogen or carboxylate and $R_3$ and $R_4$ are $C_1$ to $C_{10}$ alkyl, in an inert solvent at a reactive temperature for a time sufficient to complete the reaction, after which a mercaptoester of the formula $$HSR_5COOR_6$$

where $R_5$ is $C_1$ to $C_4$ alkylene and $R_6$ is $C_1$ to $C_{20}$ alkyl, is added to the reaction mixture in an amount about equivalent to the molar excess of the tin compound over the dimercaptan, and the reaction mixture is heated to a reactive temperature and the reaction continued until completion, after which the solvent is removed by distillation leaving the composition as a residue.

2. The compositions of claim 1 where the dimercaptan is 2-mercaptoethyl-3(and 4)-mercaptocyclohexane.

3. The compositions of claim 1 where the dimercaptan is 2,9-p-menthanedithiol.

4. The compositions of claim 1 where the tin compound is dibutyltin oxide and the dimercaptan is 2-mercaptoethyl-3(and 4)-mercaptocyclohexane.

5. The compositions of claim 1 where the tin compound is dibutyltin oxide and the dimercaptan is 2,9-p-menthanedithiol.

6. The compositions of claim 1 where the tin compound is dioctyltin oxide and the dimercaptan is 2-mercaptoethyl-3(and 4)-mercaptocyclohexane.

7. The compositions of claim 1 where the tin compound is dioctyltin oxide and the dimercaptan is 2,9-p-menthanedithiol.

8. The compositions of claim 1 in which the mercaptoester is isooctyl thioglycolate.

9. The compositions of claim 1 in which the mercaptoester is isooctyl 3-mercaptopropionate.

10. The compositions of claim 1 in which the mercaptoester is isooctyl 4-mercaptobutyrate.

11. The compositions of claim 1 in which the dimercaptan is 2-mercaptoethyl-3(and 4)-mercaptocyclohexane, the tin compound is dibutyltin oxide and the mercaptoester is isooctyl 3-mercaptopropionate.

12. The compositions of claim 1 in which the dimercaptan is 2-mercaptoethyl-3(and 4)-mercaptocyclohexane, the tin compound is dioctyltin oxide and the mercaptoester is isooctyl 3-mercaptopropionate.

13. The composition of claim 1 in which the dimercaptan is 2,9-p-menthanedithiol, the tin compound is dibutyltin oxide and the mercaptoester is isooctyl 3-mercaptopropionate.

14. The composition of claim 1 in which the dimercaptan is 2,9-p-menthanedithiol, the tin compound is dioctyltin oxide and the mercaptoester is isooctyl 3-mercaptopropionate.

References Cited
UNITED STATES PATENTS

| | | | |
|---|---|---|---|
| 3,410,884 | 11/1968 | Mack | 260—429.7 |
| 3,627,716 | 12/1971 | Cohen | 260—23 X A |
| 3,646,081 | 2/1972 | Buchholz | 260—429.7 |
| 3,716,568 | 2/1973 | Brecker et al. | 260—429.7 |

PATRICK P. GARVIN, Primary Examiner

A. P. DEMERS, Assistant Examiner

U.S. Cl. X.R.

260—45.75 K

UNITED STATES PATENT OFFICE
CERTIFICATE OF CORRECTION

Patent No. 3,804,871                    Dated  April 10, 1974

Inventor(s)  Bernard Buchholz

It is certified that error appears in the above-identified patent and that said Letters Patent are hereby corrected as shown below:

Column 3, Structure V should read as follows:

(V)

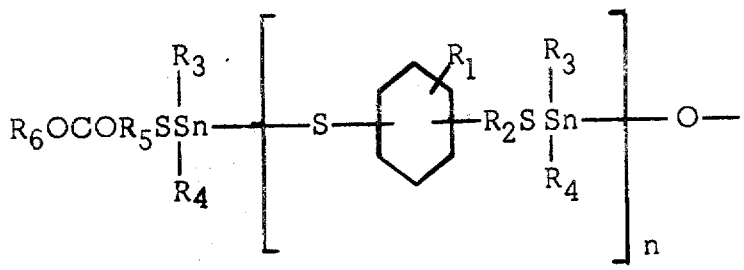

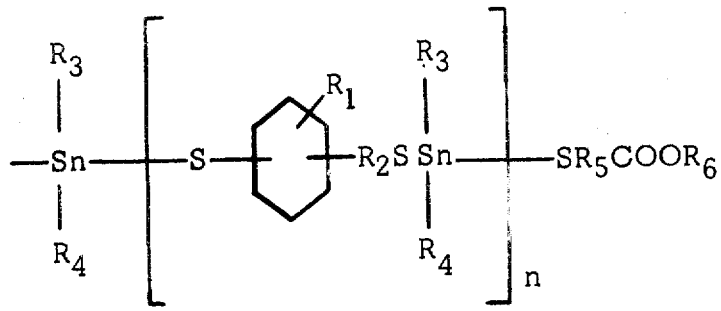

Signed and sealed this 10th day of September 1974.

(SEAL)
Attest:

McCOY M. GIBSON, JR.                C. MARSHALL DANN
Attesting Officer                    Commissioner of Patents

UNITED STATES PATENT OFFICE
CERTIFICATE OF CORRECTION

Patent No. 3,804,871　　　　　　　　　　Dated　April 10, 1974

Inventor(s)　Bernard Buchholz

It is certified that error appears in the above-identified patent and that said Letters Patent are hereby corrected as shown below:

Column 7, TABLE 4, at Line 64 delete [1]See Table 1, footnote 1

Column 7, Line 53 - change numeral 1 to --3--.

Signed and sealed this 18th day of March 1975.

(SEAL)
Attest:

RUTH C. MASON　　　　　　　　　C. MARSHALL DANN
Attesting Officer　　　　　　　Commissioner of Patents
　　　　　　　　　　　　　　　　　and Trademarks